United States Patent [19]

Steigerwald et al.

[11] Patent Number: 5,576,940
[45] Date of Patent: Nov. 19, 1996

[54] FRONT-END POWER CONVERTER FOR DISTRIBUTED POWER SYSTEMS

[75] Inventors: Robert L. Steigerwald, Burnt Hills; Ljubisa D. Stevanovic, Clifton Park, both of N.Y.

[73] Assignee: General Electric Company, Schenectady, N.Y.

[21] Appl. No.: 370,283

[22] Filed: Jan. 9, 1995

[51] Int. Cl.$^6$ ............................................. H02M 3/335
[52] U.S. Cl. ..................... 363/17; 363/89; 363/71; 363/98; 363/69
[58] Field of Search ................... 323/356; 363/17, 363/75–76, 98, 140, 136, 171, 172, 131, 132, 133, 134, 28, 79, 25–26, 20–21, 24, 17, 89, 19, 71, 67–69; 336/180, 182, 184

[56] References Cited

U.S. PATENT DOCUMENTS 4,628,426  12/1986  Steigerwald ............................. 363/17

*Primary Examiner*—Peter S. Wong
*Assistant Examiner*—Aditya Krishnan
*Attorney, Agent, or Firm*—Jill M. Breedlove; Marvin Snyder

[57] ABSTRACT

A front end converter for interfacing prime power to a lower voltage distribution bus, e.g., Vdc, in a distributed power system has a natural droop characteristic which emulates a series resistor, but without associated losses. With this droop characteristic, converters are paralleled and share load current without any interconnecting control signals, thus avoiding any single point of failure and the need for several high-voltage isolation devices. The drooping effect also has a damping effect, resulting in a more stable power system.

19 Claims, 7 Drawing Sheets

FRONT-END POWER CONVERTER FOR DISTRIBUTED POWER SYSTEMS

FIELD OF THE INVENTION

The present invention relates generally to power converters and, more particularly, to a reliable front-end converter configuration suitable for use in a distributed power system.

BACKGROUND OF THE INVENTION

Many systems that require parallel connection of power supplies use a common signal line between the supplies to control current sharing. Unfortunately, this common signal line constitutes a single point of failure. Others add a resistor in series with each paralleled converter in the supply to give the supply a finite output impedance which acts as a ballast to force current sharing, resulting in increased losses and reduced reliability. Still others electronically simulate the series resistance by actively forcing the voltage to decrease as the load current increases. While the simulation approach eliminates the losses associated with an actual resistor, it disadvantageously requires a current sensor and control circuits as well as communication between primary and secondary sides of the supply, thus requiring either opto-isolators or isolation transformers. In fact, all of these approaches require a number of either opto-isolators or isolation transformers for signal communication between primary and secondary.

Accordingly, it is desirable to minimize the number of isolators in order to provide a very reliable and economical power conversion system. It is also desirable to convert prime input power to a regulated low voltage distribution bus (e.g., 48 Vdc), while providing galvanic isolation between the input bus and the low voltage distribution bus. It is also desirable to provide a converter which is very reliable and simple, has no single point of failure when used in a parallel redundant system (i.e., no communication required between parallel power converters), and which is compatible with a distributed power system, e.g., will run in a stable manner when driving negative resistance loads. In addition, it is also desirable to eliminate any signal communication between primary and secondary that would require isolation devices.

SUMMARY OF THE INVENTION

A power converter for interfacing prime power with a lower voltage dc distribution bus according to the present invention comprises: a transformer coupled to a source of prime ac power and having a predetermined turns ratio and a predetermined leakage inductance; a full-wave rectifier coupled to the secondary winding of the transformer; and a filter for smoothing the rectified voltage to provide a regulated output voltage for a distribution bus. The leakage inductance of the transformer is selected to provide a droop characteristic for the converter such that the output voltage sags as output current in the distribution bus increases, so as to emulate a series resistor but without associated losses.

The droop characteristic advantageously allows converters to be paralleled and share load current without any interconnecting control signals, thus eliminating any single point of failure. Also, since the drooping effect acts as an equivalent series resistor, there is a damping effect and hence a more stable power system. In addition, there is no need for signal communication between primary, or source, side of the converter and the low-voltage (e.g., 48 Vdc) side of converter, therefore avoiding the need for several high-voltage isolation devices, such as opto-isolators and transformers.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
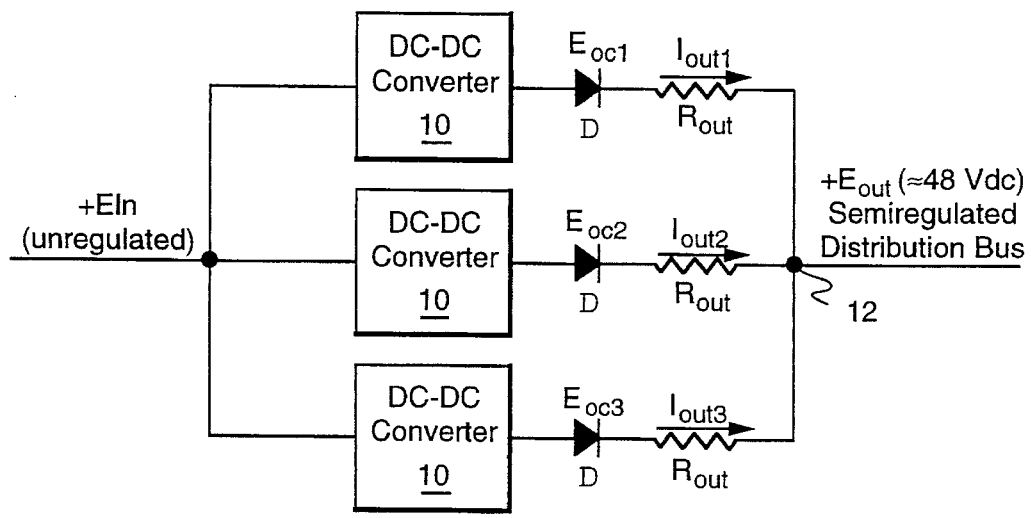
FIG. 1 schematically illustrates a conventional parallel configuration of power converters in a distributed power system.

FIG. 1 illustrates a conventional parallel connection of dc-to-dc converters 10 in a distributed power system. An unregulated voltage $+E_{in}$ is provided to each converter 10, the outputs of which are each connected in series with a diode D and a resistor $R_{out}$. The resistors $R_{out}$ are connected to each other and to a semiregulated distribution bus 12 on which an output voltage $+E_{out}$ is provided. The approach of FIG. 1 has desirable operating characteristics because the resistors act as ballasts to force the output currents of the individual supplies to be approximately equal. Furthermore, no signal connection lines are needed between converters 10, which would otherwise constitute a single point of failure. Unfortunately, however, there is substantial power dissipation due to series power resistors $R_{out}$.

Figure 2:
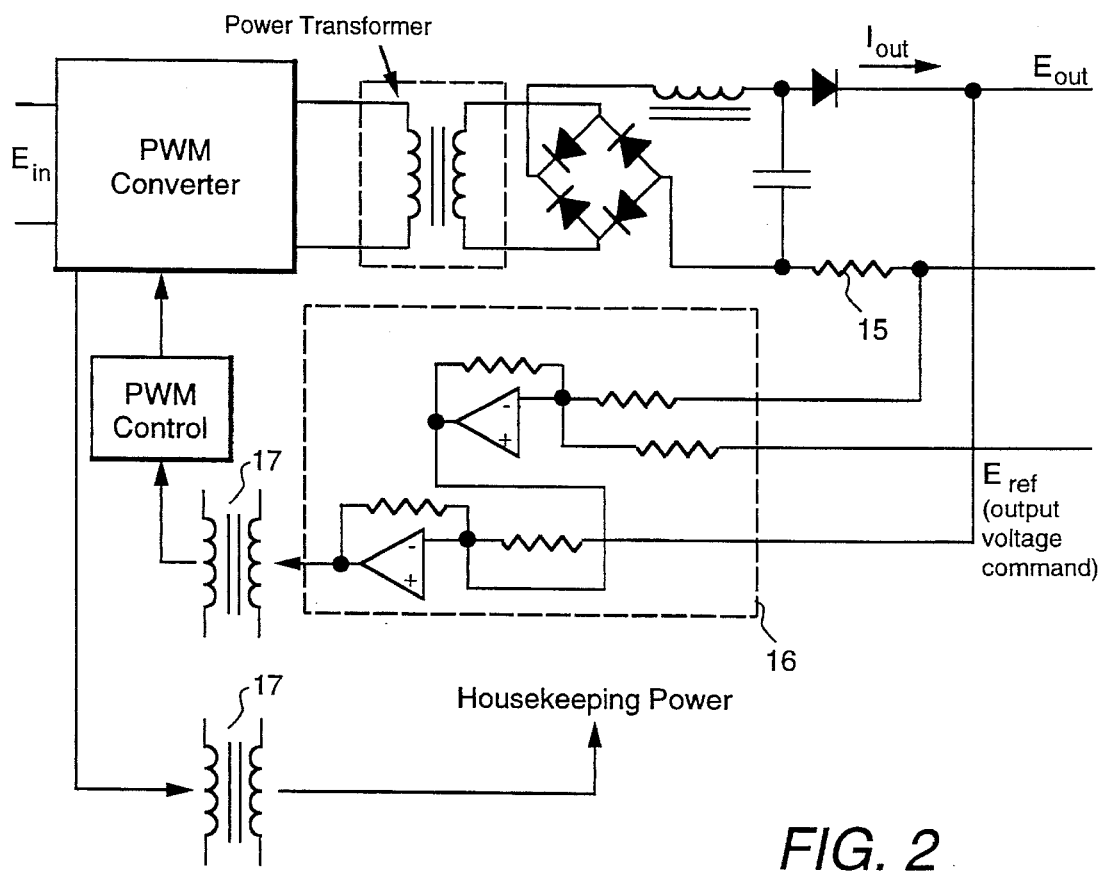
FIG. 2 illustrates an alternative to FIG. 1 which electronically simulates the series resistance $R_{out}$.

FIG. 2 illustrates another approach whereby the series resistance $R_{out}$ is simulated by actively forcing the voltage $E_{out}$ to decrease as the load current $I_{out}$ increases. Disadvantageously, the approach of FIG. 2 is fairly complicated, requiring a current sensor 15 and associated control circuits 16 in addition to voltage isolators 17 for communication and control power transfer between primary and secondary.

In accordance with the present invention, the series resistance $R_{out}$ is advantageously emulated in a substantially lossless and passive manner, i.e., with no active control, to achieve the desirable droop characteristics of the resistors $R_{out}$ as well as to achieve. other desirable characteristics described hereinbelow.

Figure 3:
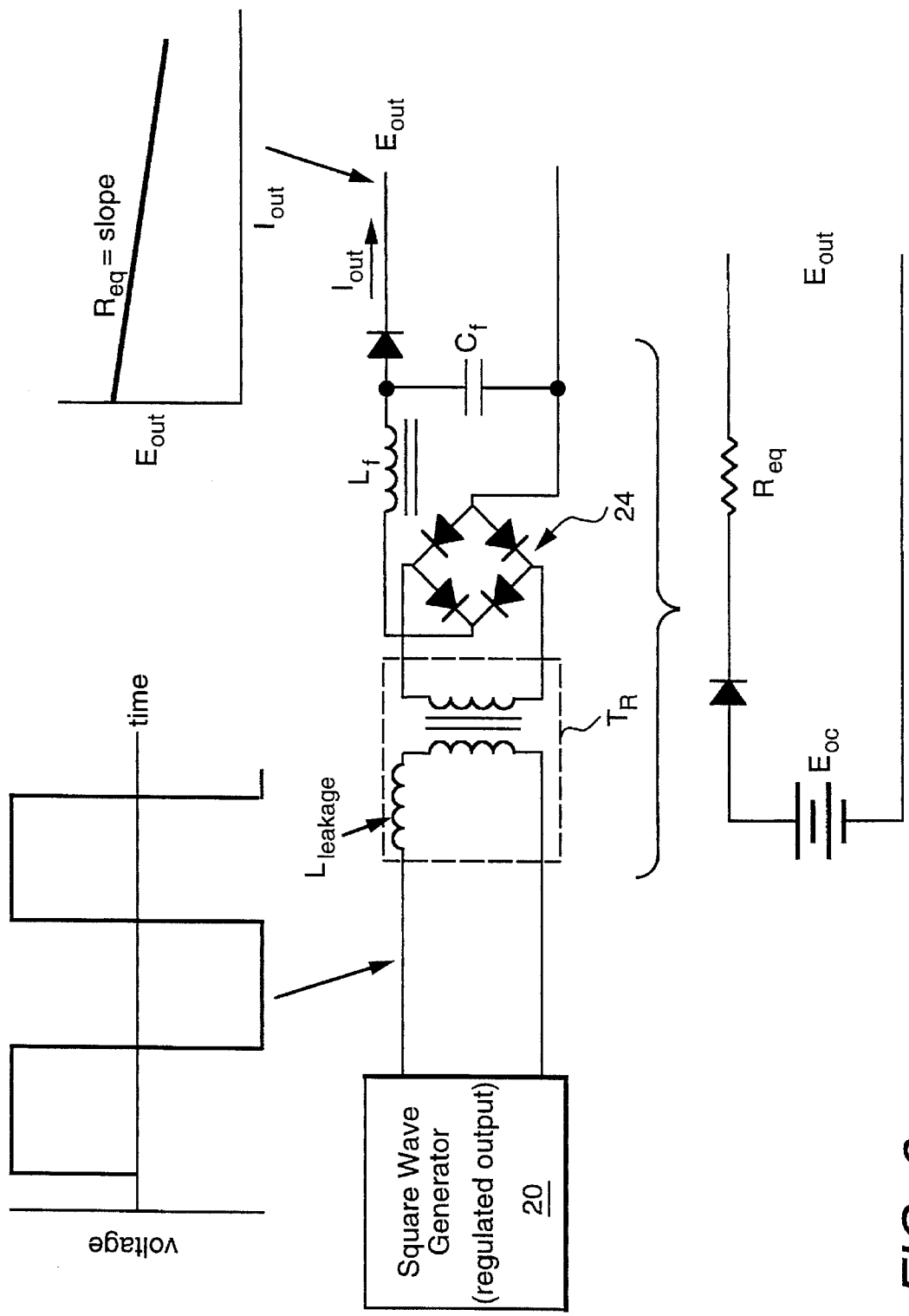
FIG. 3 schematically illustrates a converter configuration according to the present invention.

FIG. 3 illustrates a converter configuration according to the present invention for emulating the series resistance $R_{out}$ in a substantially lossless and passive manner. A regulated square-wave generator 20 drives a transformer $T_R$ with leakage inductance $L_{leakage}$. The output of the transformer is rectified by a full-wave diode rectifier 24 to provide a low voltage distribution bus $E_{out}$, e.g., approximately 48 Vdc for purposes of illustration. Due to the regulation effect of the transformer $T_R$, the output voltage $E_{out}$ droops as a function of the output current. This characteristic is illustrated in FIG. 3 by the output plot of output voltage $E_{out}$ versus output current $I_{out}$. Each time the square-wave drive reverses polarity, the current in the transformer must also reverse. This current reversal is opposed by the transformer leakage inductance $L_{leakage}$, with the time of reversal being proportional to the current therethrough. During the reversal, the output of the rectifier is essentially shorted as an output inductor $L_f$ maintains the load current through all four diode rectifiers. Thus, the output rectifier circuit is deprived of voltage for a time proportional to output current, and the average voltage at the output of the rectifier decreases as the output current increases. The output filter inductor $L_f$ and capacitor $C_f$ smooth the ripple to produce a well-filtered dc output voltage $E_{out}$ which decreases as the current $I_{out}$ increases. In this manner, the output impedance of the transformer rectifier appears as a dc voltage with a substantially lossless series resistor $R_{eq}$. Advantageously, this lossless resistive effect is achieved with no active control. The equivalent circuit for this operation is shown at the lower portion of FIG. 3 wherein $R_{eq}$ represents the equivalent lossless series resistance.

Figure 4:
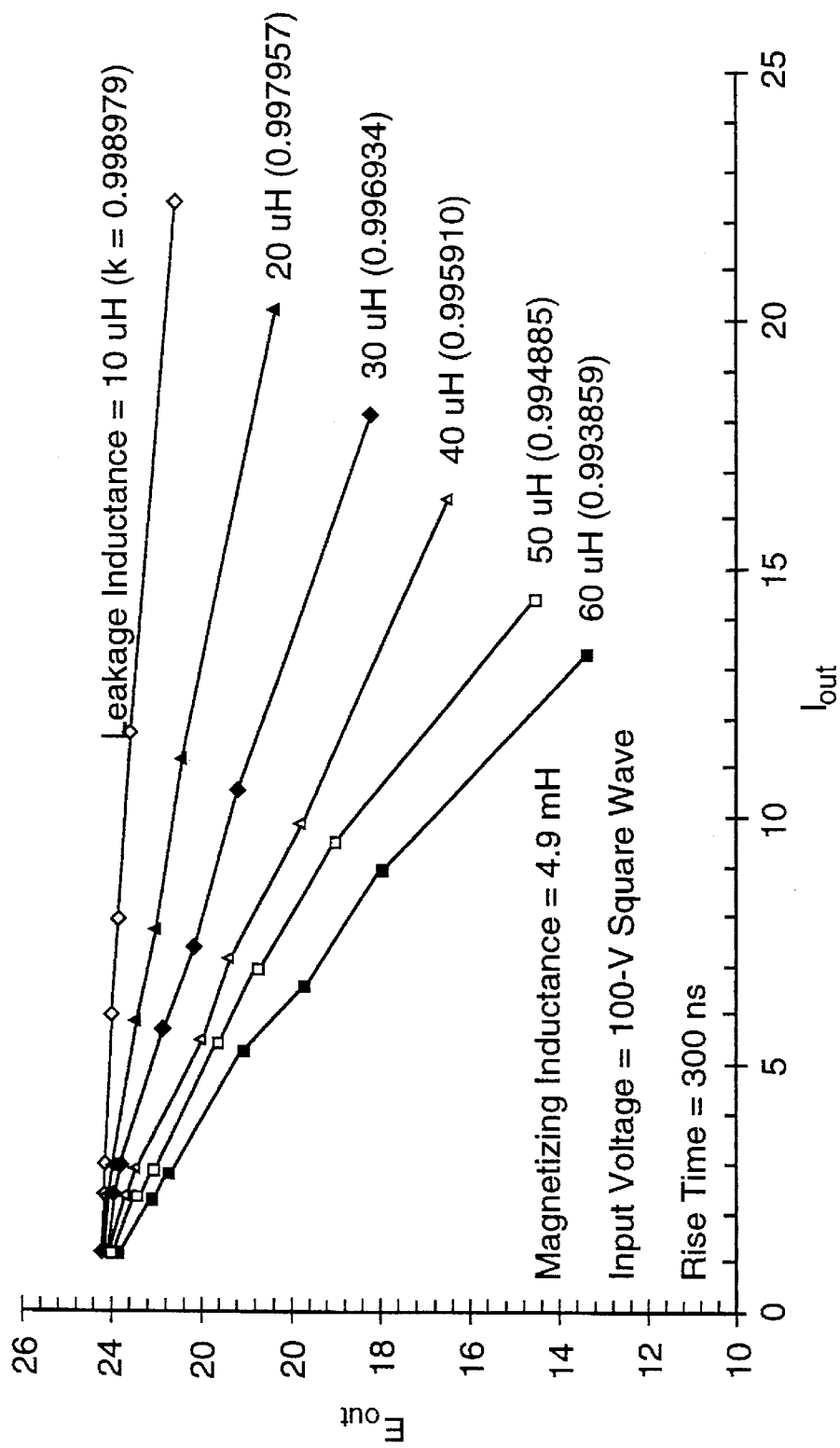
FIG. 4 graphically illustrates rectifier output characteristics, including leakage inductance effects, for various values of transformer leakage inductance for the converter configuration of FIG. 3.

FIG. 4 shows graphs of output voltage $E_{out}$ versus output current $I_{out}$ as a function of transformer leakage inductance $L_{leakage}$ for a 100 Vac to 24 Vdc conversion. The graphs were obtained from multiple simulations with two square wave power supplies driving controlled leakage transformers which, in turn, supply modular negative resistance load converters. For the simulation of FIG. 4, the results were obtained without an output filter inductance $L_f$, i.e., using a capacitive filter $C_f$ only. Good current sharing was observed both in simulation and experimentally, and droop due to current was as expected. The curves of FIG. 4 illustrate the natural (lossless) resistive droop characteristic for various values of leakage inductance. By designing the transformer to have a given leakage inductance, the amount of droop can be controlled for a given application. Advantageously, for example, primary and secondary windings of the transformer can be relatively widely separated by a predetermined distance to achieve a predetermined leakage inductance and relatively high voltage isolation between the primary and secondary windings.

Figure 5:
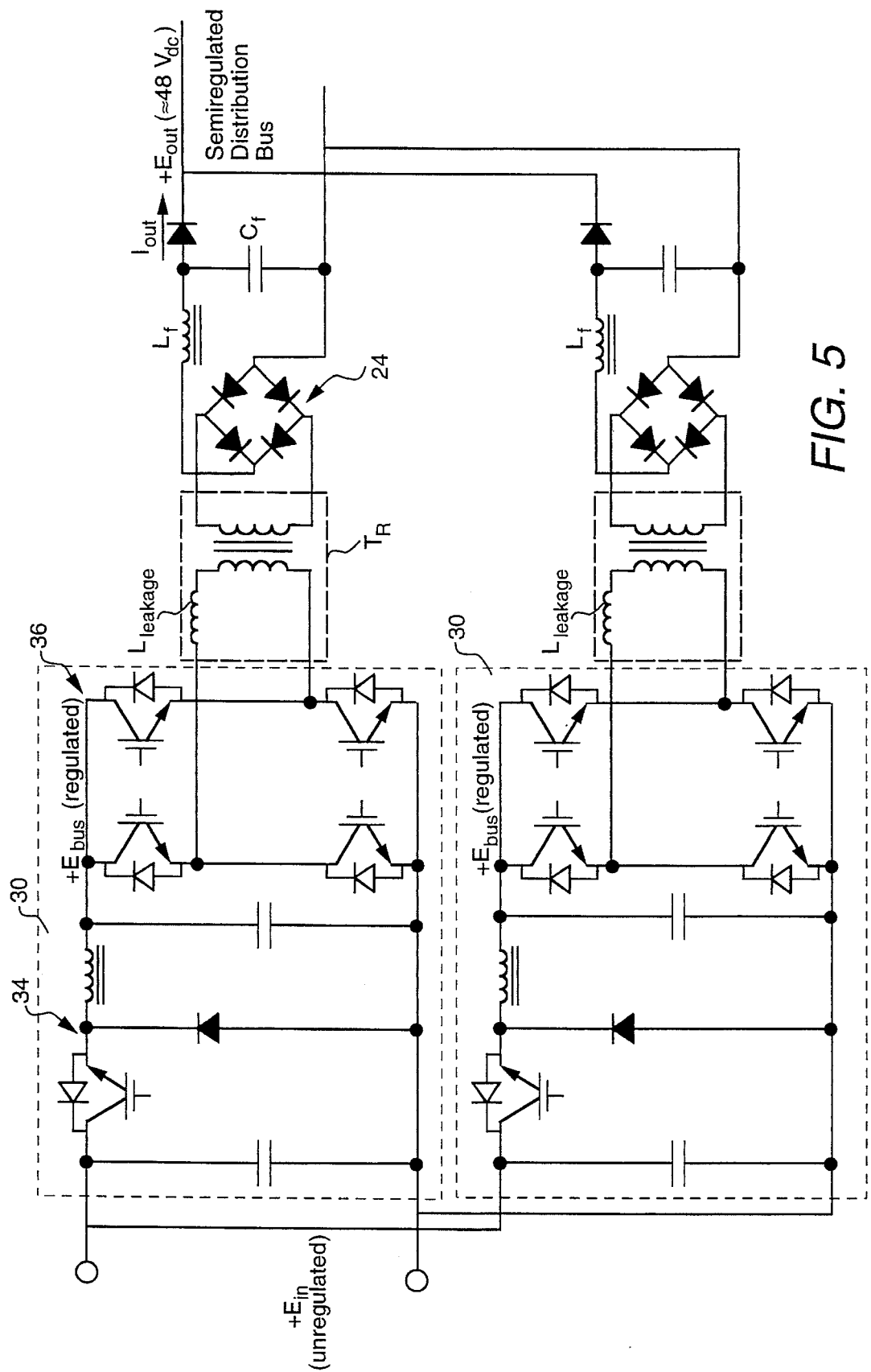
FIG. 5 schematically illustrates two converters in a parallel redundant configuration in accordance with the present invention.

FIG. 5 shows one embodiment of the invention in which, by way of example only, two converters 30 and 32 are shown in parallel. By way of illustration, a buck regulator 34 is used to derive a regulated dc bus $E_{bus}$ on the primary side of the converter which then supplies a simple full-bridge circuit 36 for generating a square wave. Because the bus $E_{bus}$ is regulated, the square wave supplied to the transformer $T_R$ is also regulated. Thus, the output of the supply $E_{out}$ is determined by the turns ratio of the transformer $T_R$, the leakage inductance $L_{leakage}$ of the transformer, and the load current $I_{out}$ according to the expression:

$$E_{out} = \frac{E_{bus}}{T_R} - I_{out} \cdot K \cdot L_{leakage} \cdot f,$$

where $I_{out}$ is the current from a single supply (approximately ½ the total load current in this case), f is the square wave frequency, and K is a proportionality factor depending on the particular rectifier circuit used. In this case:

$$R_{eq} = K \cdot L_{leakage} \cdot f$$

For most distributed power applications, the output voltage $E_{out}$ does not have to be tightly regulated because further voltage regulation is provided by the dc-to-dc converters which load the output bus $E_{out}$. For example, a 10% droop in voltage is not a problem for most applications since dc-to-dc converters with regulated outputs are the normal loads on the 48 Vdc output bus. As an example, the output bus voltage may vary from 50.4 Vdc at no load to 45.6 Vdc at full load (a +5% variation around 48 Vdc). This is more than sufficient droop to allow good current sharing in most practical applications. In fact, most commercial dc-to-dc converters that would run from such a bus can operate from 32 to 72 Vdc input voltages.

Figure 6:
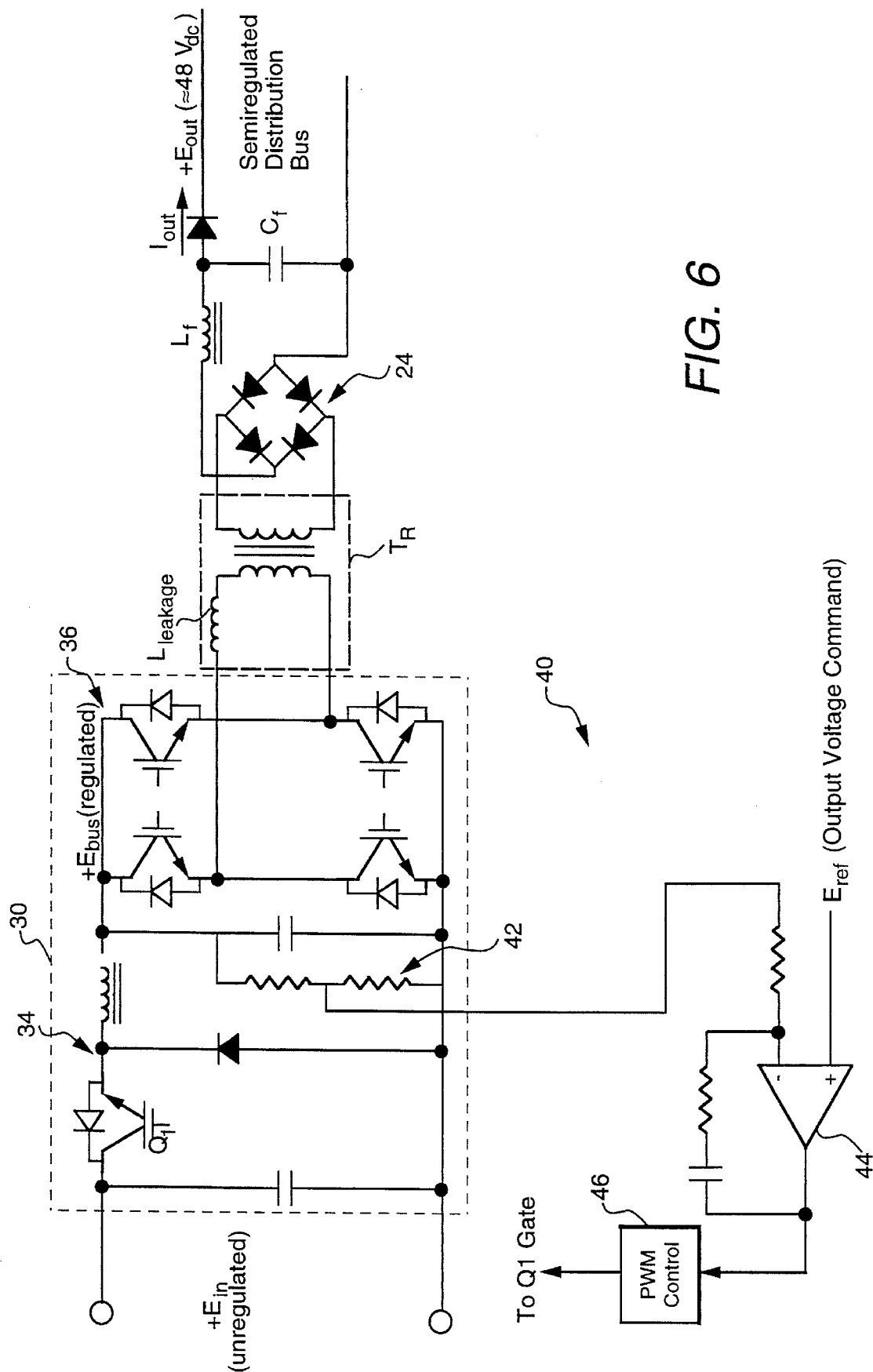
FIG. 6 schematically illustrates a simple feedback control for a front-end converter in accordance with the present invention.

Advantageously, no control signals are needed from the secondary side of the converter. It is simply a matter of regulating the primary bus $E_{bus}$. A simple PWM control 40 for regulating the primary bus using feedback is illustrated in FIG. 6 wherein a voltage proportional to the bus voltage $E_{bus}$ is sensed by voltage sensor 42 and compared in an operational amplifier 44 to an output voltage command $E_{ref}$. The output of operational amplifier 44 is provided to a PWM control 46 for driving device $Q_1$. Conventional current-mode control could alternatively be used. Moreover, although buck regulator 34 is specifically illustrated, this is by way of example only since the dc bus $E_{bus}$ can be regulated from any prime power source using any type of converter. For example, the bus could be established by a high power factor boost circuit (e.g., boost, buck-boost, Cuk, etc.) for applications with an ac input source.

Alternatively, feedforward control can be used, as described hereinbelow, to establish a reasonably regulated dc bus $E_{bus}$ that would be suitable for many applications. Advantageously, input ripple would be rejected to a high degree. Excellent audio susceptibility would result for applications sensitive thereto.

Advantageously, by the converter configuration of the present invention, prime input power is converted to a regulated low voltage (e.g., 48 Vdc) distribution bus which provides isolation. In addition, the converter configuration is very simple and reliable, has no single point of failure when used in a parallel redundant system, such that no communication between parallel power converters is required, and is compatible with a distributed power system, e.g., will run in a stable manner when driving negative resistance loads. Furthermore, all signal communication between primary and secondary that would require isolation devices is eliminated. Also, since the drooping effect acts as an equivalent series resistor, there is a damping effect and hence a more stable power system. As another advantage, since the main power transformer $T_R$ is the only device requiring isolation, and since a relatively high leakage inductance is utilized, a relatively wide separation of primary and secondary windings may be used to achieve high-voltage isolation. Still further, if desired, excellent audiosusceptibility performance can be achieved using simple feedforward control.

Although the invention has been described with reference to a converter 34 that produces a regulated dc bus followed by a bridge circuit 36, the converter used to establish the regulated dc bus voltage (e.g., boost, buck-boost, Cuk, etc.) is not needed for many applications. The output bridge 36 itself can be modulated to produce a regulated PWM waveform which drives the transformer. Thus, the average rectified open circuit voltage at the output of the converter would be regulated by. PWM action, while the voltage droop due to the leakage effect would still be as previously described. Feedforward control can be used to eliminate the need for primary-to-secondary signal communication. Half-bridges and push-pull circuits could also be used instead of the full-bridge.

Figure 7:
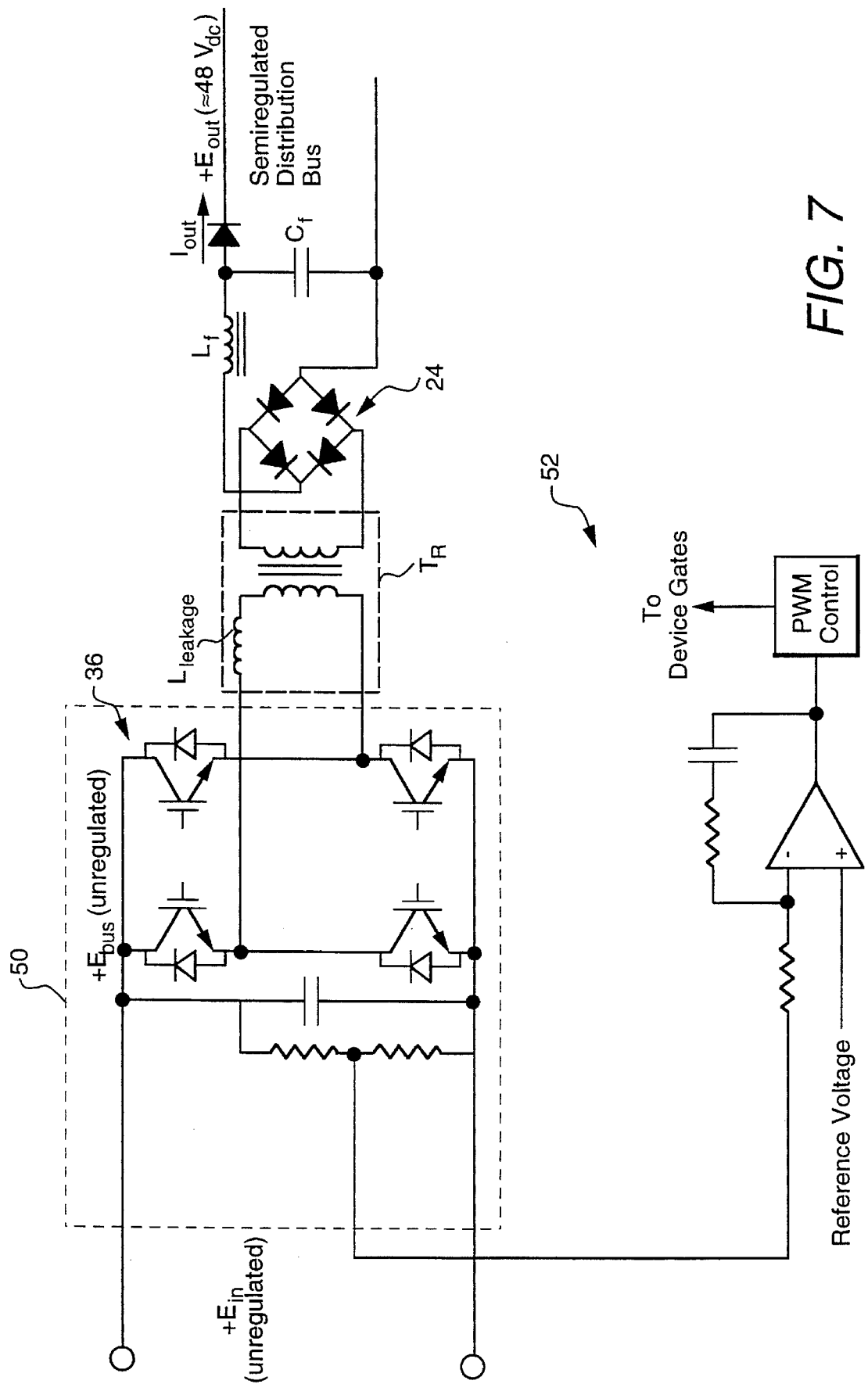
FIG. 7 schematically illustrates a simple feedforward control for a front-end converter of the present invention with a PWM controlled full-bridge.

FIG. 7 shows a full-bridge embodiment of converter 50 along with a simple feedforward control 52. The full bridge can be pulse width modulated in conventional fashion such that switching devices in opposite corners are gated on and off simultaneously, or by phase shifting the converter legs. Phase shifting results in soft-switching performance and hence low switching losses, as is well known. A power distribution system based on such a configuration would result in a highly reliable, practical solution for many applications. As illustrated, there is no front-end switching converter that produces the regulated dc bus $E_{bus}$ (regulated) in this configuration because it is implied by regulating the pulse width modulated (PWM) action of the full-bridge converter. In this case, primary-side feedforward control 52 modulates PWM action of the bridge to keep its output waveform constant in the presence of voltage variations on the dc bus $E_{bus}$ (unregulated).

Figure 8:
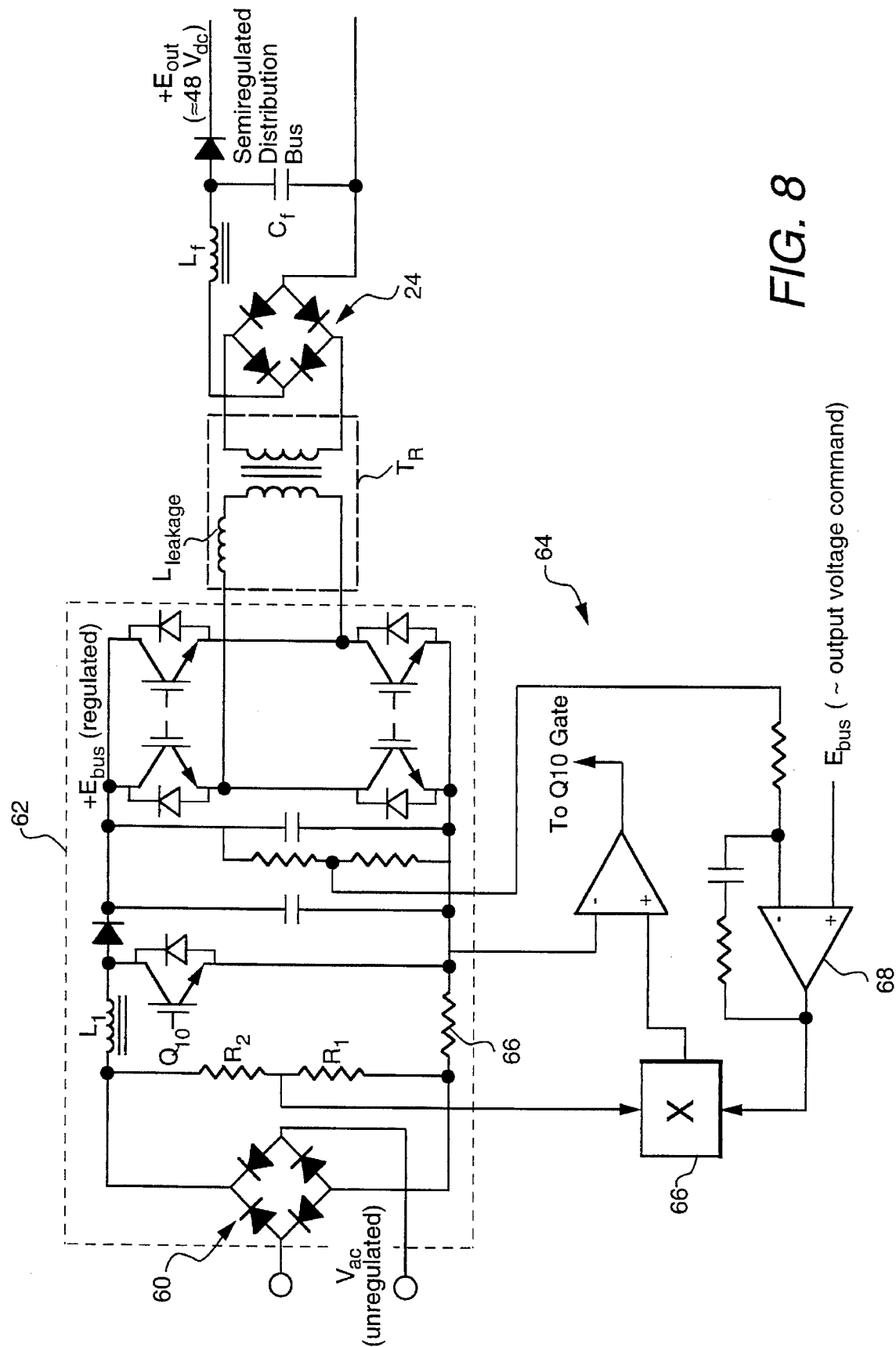
FIG. 8 schematically illustrates an alternative embodiment of a converter configuration according to the present invention utilizing an ac input voltage.

FIG. 8 illustrates an alternative embodiment of a converter configuration according to the present invention using an ac input voltage Vac which is rectified by a full-wave rectifier 60 to provide a rectified input voltage |Vac|. A high power factor converter 62, comprising, for example, an inductor L1 and a switching device $Q_{10}$ form a boost converter that can be operated at high power factor using any well-known technique, such as described in Kocher and Steigerwald U.S. Pat. No. 4,386,344, issued May 31, 1983. By way of example, FIG. 8 illustrates a control 64 whereby the rectified current from the ac line, as sensed by a current sensor 66, is forced to follow the rectified ac line voltage $|V_{ac}|$. In this manner, the ac current is in phase with the ac line voltage giving near unity power factor. The dc bus $E_{bus}$ is controlled by feeding back a voltage proportional to the bus voltage $E_{bus}$, comparing it to a reference voltage $E_{bus}^*$ in a comparator 68, and adjusting the magnitude of the current drawn from the line. This voltage feedback loop is much slower than the current control feedback loop. The current control feedback loop forces the line current to be proportional to the line voltage. The proportionality constant is implemented using a multiplier 70. Note that two of these converters can be directly paralleled just as described hereinabove to obtain parallel redundant operation with all the advantages of the invention. Using this technique, a highly reliable redundant dc distribution bus can be obtained from an ac source, while providing near ideal loading of the ac source, i.e., unity power factor operation.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A power converter for interfacing prime power with a lower voltage distribution bus, comprising:

a front-end converter for providing a regulated dc voltage on a dc voltage bus from a source of said prime power and for providing an ac voltage at a pair of output terminals of said front-end converter;

a transformer having a predetermined leakage inductance, a primary winding of said transformer being coupled across said output terminals of said front-end converter; and a rectifier coupled to a secondary winding of said transformer, said rectifier providing a rectified output voltage on said distribution bus;

said leakage inductance of said transformer being selected to provide a damping effect and a droop characteristic for said converter in a substantially lossless and passive manner such that said output voltage sags as an output current in said distribution bus increases.

2. The converter of claim 1 wherein said front-end converter comprises a bridge converter.

3. The converter of claim 1 wherein said front-end converter comprises an up-front converter for providing said regulated dc voltage and further comprises a second converter coupled to said dc voltage bus for providing said ac voltage.

4. The converter of claim 3 wherein said second converter comprises a bridge converter.

5. The converter of claim 1, further comprising feedback control to regulate the ac voltage applied to the primary winding of said transformer.

6. The converter of claim 1, further comprising feedforward control to regulate the ac voltage applied to the primary winding of said transformer.

7. The converter of claim 1, further comprising an output filter for smoothing said output voltage.

8. The converter of claim 1 wherein said primary and secondary windings of said transformer are separated by a predetermined distance to achieve said predetermined leakage inductance and relatively high voltage isolation between said primary and secondary windings.

9. A power converter for interfacing prime power with a lower voltage distribution bus, comprising:

a front-end PWM converter for providing a substantially regulated ac output voltage from said prime power;

a transformer having a predetermined leakage inductance, a primary winding of said transformer being coupled across said output terminals of said PWM converter; and a rectifier coupled to a secondary winding of said transformer, said rectifier providing a rectified output voltage on said distribution bus;

said leakage inductance of said transformer being selected to provide a damping effect and a droop characteristic for said power converter in a substantially lossless and passive manner such that said output voltage sags as an output current in said distribution bus increases.

10. The converter of claim 9 wherein said PWM converter comprises a bridge converter.

11. The converter of claim 9, further comprising feedback control to regulate the ac voltage applied to the primary winding of said transformer.

12. The converter of claim 9, further comprising feedforward control to regulate the ac voltage applied to the primary winding of said transformer.

13. The converter of claim 9, further comprising an output filter for smoothing said output voltage.

14. A power converter for interfacing prime power with a lower voltage distribution bus, comprising:

a rectifier for providing a rectified voltage from an ac line voltage;

a high power factor, front-end converter for providing a regulated ac voltage at a pair of output terminals of said front-end converter from said rectified voltage;

a transformer having a predetermined leakage inductance, a primary winding of said transformer being coupled across said output terminals of said front-end converter; and a rectifier coupled to a secondary winding of said transformer, said rectifier providing a rectified output voltage on said distribution bus;

said leakage inductance of said transformer being selected to provide a damping effect and a droop characteristic for said converter in a substantially lossless and passive manner such that said output voltage sags as an output current in said distribution bus increases.

15. The converter of claim 14 wherein said front-end converter comprises an up-front converter for providing a regulated dc voltage on a dc voltage bus from said rectified voltage and further comprises a second converter coupled to said dc voltage bus for providing said ac voltage.

16. The converter of claim 15 wherein said second converter comprises a bridge converter.

17. The converter of claim 14, further comprising feedback control to regulate the ac voltage applied to the primary winding of said transformer.

18. The converter of claim 14 wherein said primary and secondary windings of said transformer are separated by a predetermined distance to achieve said predetermined leakage inductance and relatively high voltage isolation between said primary and secondary windings.

19. In a distributed power system comprising at least two power converters coupled in parallel, each of said power converters interfacing prime power with a lower voltage distribution bus, each of said power converters comprising:

a front-end converter for providing a regulated dc voltage on a dc voltage bus from a source of said prime power and for providing an ac voltage at a pair of output terminals of said front-end converter;

a transformer having a predetermined leakage inductance, a primary winding of said transformer being coupled across said output terminals of said front-end converter; and a rectifier coupled to a secondary winding of said transformer, said rectifier providing a rectified output voltage on said distribution bus;

said leakage inductance of said transformer being selected to provide a damping effect and a droop characteristic for said converter in a substantially lossless and passive manner such that said output voltage sags as an output current in said distribution bus increases; and said power converters sharing current approximately equally.

* * * * *